US010009272B2

(12) United States Patent
Lee et al.

(10) Patent No.: US 10,009,272 B2
(45) Date of Patent: Jun. 26, 2018

(54) PACKET TRANSMISSION APPARATUS FOR PROCESSING OPERATIONS, ADMINISTRATION, AND MAINTENANCE (OAM) PACKET AND PROTECTION SWITCHING MESSAGE

(71) Applicant: ELECTRONICS AND TELECOMMUNICATIONS RESEARCH INSTITUTE, Daejeon (KR)

(72) Inventors: Won Kyoung Lee, Daejeon (KR); Jeong Dong Ryoo, Daejeon (KR); Tae Sik Cheung, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 88 days.

(21) Appl. No.: 15/160,445

(22) Filed: May 20, 2016

(65) Prior Publication Data

US 2016/0344630 A1 Nov. 24, 2016

(30) Foreign Application Priority Data

May 22, 2015 (KR) .................. 10-2015-0071523

(51) Int. Cl.
*H04L 12/26* (2006.01)
*H04L 12/741* (2013.01)
*H04L 12/723* (2013.01)
*H04L 12/713* (2013.01)
*H04L 12/931* (2013.01)
*H04L 12/24* (2006.01)

(52) U.S. Cl.
CPC ........ *H04L 45/745* (2013.01); *H04L 41/0668* (2013.01); *H04L 43/0811* (2013.01); *H04L 45/50* (2013.01); *H04L 45/586* (2013.01); *H04L 49/00* (2013.01)

(58) Field of Classification Search
CPC ..... H04L 45/745; H04L 45/586; H04L 45/50; H04L 41/0668; H04L 43/0811; H04L 49/00
USPC ................................. 370/216–228, 242–251
See application file for complete search history.

(56) References Cited

U.S. PATENT DOCUMENTS 8,774,009 B2   7/2014 Jocha et al.
9,160,446 B2 * 10/2015 Cohn .................. H04B 10/032
(Continued)

FOREIGN PATENT DOCUMENTS

KR      2015-0007623 A     1/2015

*Primary Examiner* — Thai Hoang
(74) *Attorney, Agent, or Firm* — Rabin & Berdo, P.C.

(57) ABSTRACT

Provided is a packet transmission apparatus including at least one user network interface (UNI) line card configured to receive traffic including a client signal, a fabric switch configured to perform switching on the traffic based on a unit of line card, a network-to-network interface working (NNI-W) line card configured to generate a multiprotocol label switching-transport profile (MPLS-TP) working tunnel to transmit the traffic transferred through the fabric switch, and a network-to-network interface protection (NNI-P) line card configured to generate a MPLS-TP protection tunnel to transmit the traffic transferred through the fabric switch when a fault occurs on a path of the NNI-W line card.

20 Claims, 13 Drawing Sheets

(56) References Cited

U.S. PATENT DOCUMENTS

| | | | |
|---|---|---|---|
| 2012/0127855 A1* | 5/2012 | Alon | H04L 12/413 370/218 |
| 2012/0182990 A1 | 7/2012 | Cao | |
| 2013/0021918 A1* | 1/2013 | Fiorone | H04L 43/0817 370/242 |
| 2014/0219080 A1 | 8/2014 | Kim et al. | |
| 2014/0241165 A1 | 8/2014 | Osswald | |
| 2014/0341012 A1* | 11/2014 | Holness | H04L 41/0659 370/225 |
| 2015/0043330 A1* | 2/2015 | Hu | H04L 49/557 370/225 |
| 2015/0195178 A1* | 7/2015 | Bhattacharya | H04L 45/745 718/1 |
| 2017/0244632 A1* | 8/2017 | Tang | H04L 45/50 |

\* cited by examiner

FIG. 5
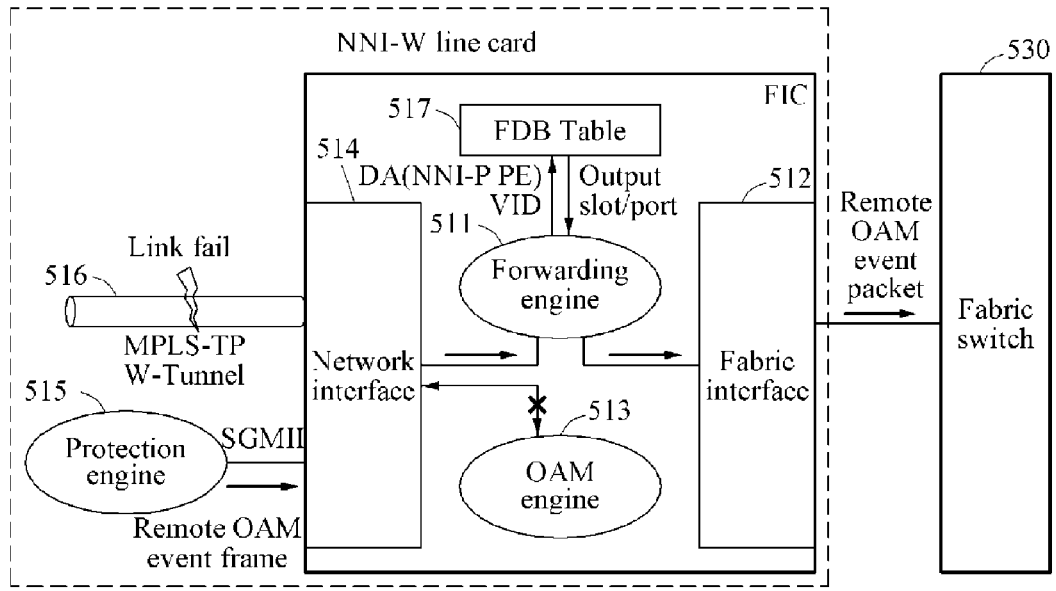
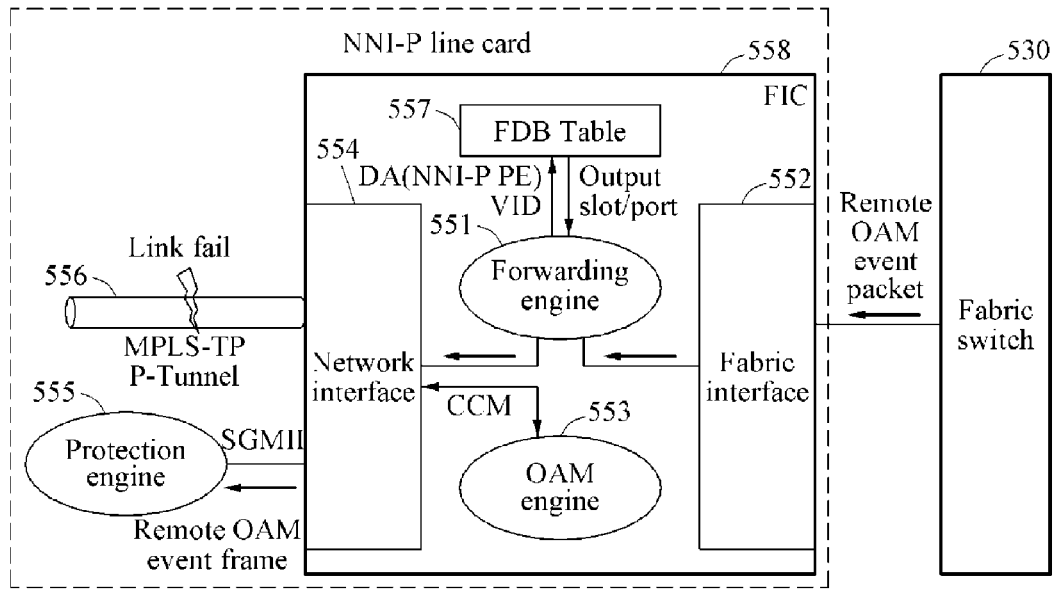

| | Packet size | | TC | Src sys port (slot+port) | |
|---|---|---|---|---|---|
| Output port | DP | Overhead type | | | |
| | | APP EXT | | | |
| | | | | | |
| | advance_trap_info (5 Bytes) | | | | |

⎫
⎬ 610
⎭

| | DA(Remote protection engine MAC address) |
|---|---|
| DA | |
| SA(Local protection engine MAC address) | |
| SA | VLAN TPID (0x8100) |
| VLAN TCI | EtherType (0x88b5) |

⎫
⎬ 630
⎭

| Length (2* number of entries) | E | 0 | 0 | MEP ID |
|---|---|---|---|---|
| E | 0 | 0 | MEP ID | ⋮ |
| ⋮ | | | | ⋮ |

| | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|
| colspan Packet size | | | | | | | | | TC | | | Src sys port (slot+port) | | | | | | | | | | | | | | | | | | | |

<table>
<tr><td colspan="6">Packet size</td><td colspan="2">TC</td><td colspan="8">Src sys port (slot+port)</td><td rowspan="4">} 1010</td></tr>
<tr><td colspan="4">Output port</td><td>DP</td><td colspan="3">Overhead type</td><td colspan="8"></td></tr>
<tr><td colspan="8">APP_EXT</td><td colspan="8"></td></tr>
<tr><td colspan="8">MEP ID——1015</td><td colspan="8">Trap code</td></tr>
<tr><td colspan="8">Start of frame →</td><td colspan="8">DA(Next hop MAC)</td><td rowspan="11">} 1030</td></tr>
<tr><td colspan="16">DA</td></tr>
<tr><td colspan="16">SA(Local node MAC)</td></tr>
<tr><td colspan="8">SA</td><td colspan="8">VLAN TPID (0x8100)</td></tr>
<tr><td colspan="8">VLAN TCI</td><td colspan="8">EtherType (0x8847)</td></tr>
<tr><td colspan="8">MPLS Label #1</td><td colspan="2">TC</td><td>S</td><td colspan="5">TTL</td></tr>
<tr><td colspan="8">MPLS Label #2</td><td colspan="2">TC</td><td>S</td><td colspan="5">TTL</td></tr>
<tr><td colspan="8">MPLS Label #3</td><td colspan="2">TC</td><td>S</td><td colspan="5">TTL</td></tr>
<tr><td colspan="8">MPLS Label #4</td><td colspan="2">TC</td><td>S</td><td colspan="5">TTL</td></tr>
<tr><td colspan="8">Label(13)</td><td colspan="2">TC</td><td>S</td><td colspan="5">TTL(1)</td></tr>
<tr><td>0001</td><td colspan="2">Version(0)</td><td colspan="5">Reserved(0)</td><td colspan="8">Channel Type (0x0024)</td></tr>
<tr><td>V(1)</td><td colspan="2">Request</td><td>PT</td><td>R</td><td colspan="3">Reserved(0)</td><td colspan="4">Fault path</td><td colspan="4">Data path</td><td rowspan="4">} 1050</td></tr>
<tr><td colspan="8">TLV length(8)</td><td colspan="8">Reserved(0)</td></tr>
<tr><td colspan="8">Capabilities TLV type(1)</td><td colspan="8">Capabilities TLV length(4)</td></tr>
<tr><td colspan="16">Flags(0xF8000000)</td></tr>
</table>

PACKET TRANSMISSION APPARATUS FOR PROCESSING OPERATIONS, ADMINISTRATION, AND MAINTENANCE (OAM) PACKET AND PROTECTION SWITCHING MESSAGE

CROSS-REFERENCE TO RELATED APPLICATION

This application claims the priority benefit of Korean Patent Application No. 10-2015-0071523, filed on May 22, 2015, in the Korean Intellectual Property Office, the disclosure of which is incorporated herein by reference.

BACKGROUND

1. Field of the Invention

Embodiments relate to a packet transmission apparatus for processing a protection switching message and an operations, administration, and maintenance (OAM) packet used to perform hardware-based multiprotocol label switching-transport profile (MPLS-TP) linear protection switching.

2. Description of the Related Art

On the basis of the provision of packet-based services such as Ethernet, Voice over Internet protocol (VoIP), L2/L3 virtual private network (VPN), and Internet protocol television (IPTV), a bandwidth used for the services is also rapidly increasing. To increase the bandwidth, hybrid transmission technology based on both packet transmission technology and line transmission technology may be applied to metro and core networks.

The packet transmission technology may need to ensure an accurate packet processing and a reliability corresponding to a level of synchronous digital hierarchy (SDH)/synchronous optical network (SONET). Also, the packet transmission technology may need to ensure a smooth interworking with a general packet network. To this end, multi protocol label switching-transport profile (MPLS-TP) technology to which multi protocol label switching (MPLS) technology is corrected to be suitable for a packet transmission network may be provided as the packet transmission technology. The MPLS-TP technology may provide connection-oriented packet switching technology and a multilevel fault recovery mechanism including, for example, a link, a transmission path, and a segment. In MPLS-TP fault recovery technology, in general, a service may need to be recovered within 50 milliseconds (ms) from a point in time at which the fault is detected. In a case in which the number of MPLS-TP bidirectional paths, that is, tunnels rapidly increases, the fault recovery time may exceed 50 ms.

SUMMARY

An embodiment is provided to ensure a fault recovery time within 50 milliseconds (ms) despite an increase in the number of MPLS-TP bidirectional paths.

According to an aspect, there is provided a packet transmission apparatus including at least one user network interface (UNI) line card configured to receive traffic including a client signal, a fabric switch configured to perform switching on the traffic based on a unit of line card, a network-to-network interface working (NNI-W) line card configured to generate a multiprotocol label switching-transport profile (MPLS-TP) working tunnel to transmit the traffic transferred through the fabric switch, to an MPLS-TP tunnel, and a network-to-network interface protection (NNI-P) line card configured to generate a MPLS-TP protection tunnel to transmit the traffic transferred through the fabric switch, to a protection tunnel when a fault occurs on a path of the NNI-W line card.

The packet transmission apparatus of claim 1, wherein the NNI-W line includes a first forward engine configured to edit an MPLS label in a header of a client packet and transmit the client packet to an output port, a first operations, administration, and maintenance (OAM) engine configured to detect whether the fault occurs on the path using a continuity check message (CCM) packet periodically received through the MPLS-TP working tunnel, and transmit an OAM event based on a result of the detecting, and a first protection engine configured to transfer a protection switching message to the first forwarding engine based on the OAM event, wherein the first forwarding engine and the first OAM engine may be implemented using a first fabric interface chip, and the first OAM engine may be configured to store all OAM events occurring during a predetermined period of time in one packet frame and transmit an OAM packet generated by adding an internal overhead to the one packet frame to the first protection engine.

The first OAM engine may be configured to transmit the OAM packet to the first protection engine through a port connected with the first fabric interface chip.

The internal overhead may include information used to classify a plurality of OAM events.

The NNI-W line card and the NNI-P line card may be classified based on a port through which the traffic is transmitted.

The NNI-P line card may include a second forwarding engine configured to edit an MPLS label in a header of a client packet and transmit the client packet through an output port, a second OAM engine configured to detect whether a fault occurs on a path using a CCM packet periodically received through the MPLS-TP protection tunnel and provide notification about an OAM event based on a result of the detecting, and a second protection engine configured to determine a protection switching command based on the OAM event and an OAM event received from the first protection engine of the NNI-W line card, and transfer the protection switching command to the second forwarding engine, wherein when a fault occurs in the MPLS-TP working tunnel of the NNI-W line card, the first protection engine may be configured to transfer an OAM event of the NNI-W line card to the second protection engine using an L2 forwarding function based on a predetermined virtual local area network (VLAN) identification (ID) and a media access control (MAC) address of the second protection engine.

The second OAM engine and the second forwarding engine may be implemented through a second fabric interface chip, wherein the second fabric interface chip may be configured to receive the OAM packet from the first protection engine through a port connected with the first fabric interface chip, configured to search for a forwarding table previously set based on a VLAN IP and a MAC address of a destination of the OAM packet, and configured to transfer the OAM event of the NNI-W line card to the second protection switch engine through a port connected with the second protection engine and a number of the NNI-P line card found in a result of the searching.

The second protection engine may be configured to transmit a protection switching message to a counterpart protection engine of a protection switching domain through the MPLS-TP protection tunnel.

The second fabric interface chip may be configured to transmit the protection switching message to an interface of the MPLS-TP protection tunnel using the L2 forwarding function based on a VLAN IP and an MAC address of the MPLS-TP protection tunnel.

When the MPLS-TP protection tunnel is generated, the second fabric interface chip may be configured to inform the second protection engine of interface information and a label of the MPLS-TP protection tunnel and generate an L2 forwarding table based on information on an output port, the VLAN ID, and the MAC address of the MPLS-TP protection tunnel.

The second fabric interface chip may be configured to search for an L2 forwarding table previously set based on the a VLAN ID and a MAC address of a destination of a packet received in the NNI-P line card, and transmit the protection switching message by detecting an output port connected with a protection tunnel of a counterpart NNI-P line card of a protection switching domain obtained as a result of the searching.

The second OAM engine may be configured to trap a protection switching message received through the MPLS-TP protection tunnel to a predetermined port connected with the second protection engine.

An internal overhead including maintenance entity group end point (MEP) ID information may be added to the protection switching message trapped to the second protection engine.

When the protection switching message received through the MPLS-TP protection tunnel is another protection switching message differing from an automatic protection switching (APS) message, the second OAM engine may be configured to transfer the other protection switching message by adding the other protection switching message as a type of OAM channel.

When the protection switching message is a protection state coordination (PSC) message, the second OAM engine may be configured to correct a filtering table for a maintenance entity group level (MEL) of the PSC message and transfer, to the second protection engine, the PSC message in which the filtering table is corrected.

The at least one UNI line card may include a forwarding engine configured to receive a protection switching command packet and a path selecting register configured to select one of the MPLS-TP working tunnel and the MPLS-TP protection tunnel, and the second protection engine may be configured to transfer the protection switching command to the at least one UNI line card using the protection switching command packet based on an L2 forwarding function based on an VLAN ID and an MAC address of the forwarding engine of the at least one UNI line card.

The second protection engine may be configured to generate an L2 forwarding table based on information on an output port, the VLAN ID, and the MAC address of the forwarding engine of the at least one UNI line card.

The second protection engine may be configured to search for an output port connected with the at least one UNI line card using the L2 forwarding table previously set based on the VLAN ID and the MAC address of the destination of the received packet and transfer the protection switching command to the at least one UNI line card through the output port found through the searching.

The protection switching command packet may include switching command information and an L2 header including the MAC address of the second protection engine and the MAC address of the forwarding engine of the at least one UNI line card.

The forwarding engine of the at least one UNI line card may be configured to search for an offset of the path selecting register based on an MEP ID in response to the receiving of the protection switching command packet, change a entry value of the path selecting register based on the switching command information, and change a transmission path of data traffic from the MPLS-MP working tunnel to the MPLS-TP protection tunnel or from the MPLS-TP protection tunnel to the MPLS-MP working tunnel.

BRIEF DESCRIPTION OF THE DRAWINGS

These and/or other aspects, features, and advantages of the invention will become apparent and more readily appreciated from the following description of embodiments, taken in conjunction with the accompanying drawings of which:

FIG. 5 is a block diagram illustrating a procedure of transmitting an OAM event from a protection engine of an NNI-W line card to a protection engine of an NNI-P line card in the NNI-W and NNI-P line cards of a packet transmission apparatus according to an embodiment;

FIG. 6 is a diagram illustrating a frame format of a packet transferring an OAM event to a protection engine of an NNI-P line card of a packet transmission apparatus according to an embodiment;

FIG. 10 is a diagram illustrating a format of a protection state coordination (PSC) type protection switching message transmitted from a packet transmission apparatus to a protection engine according to an embodiment;

DETAILED DESCRIPTION

Figure 1:
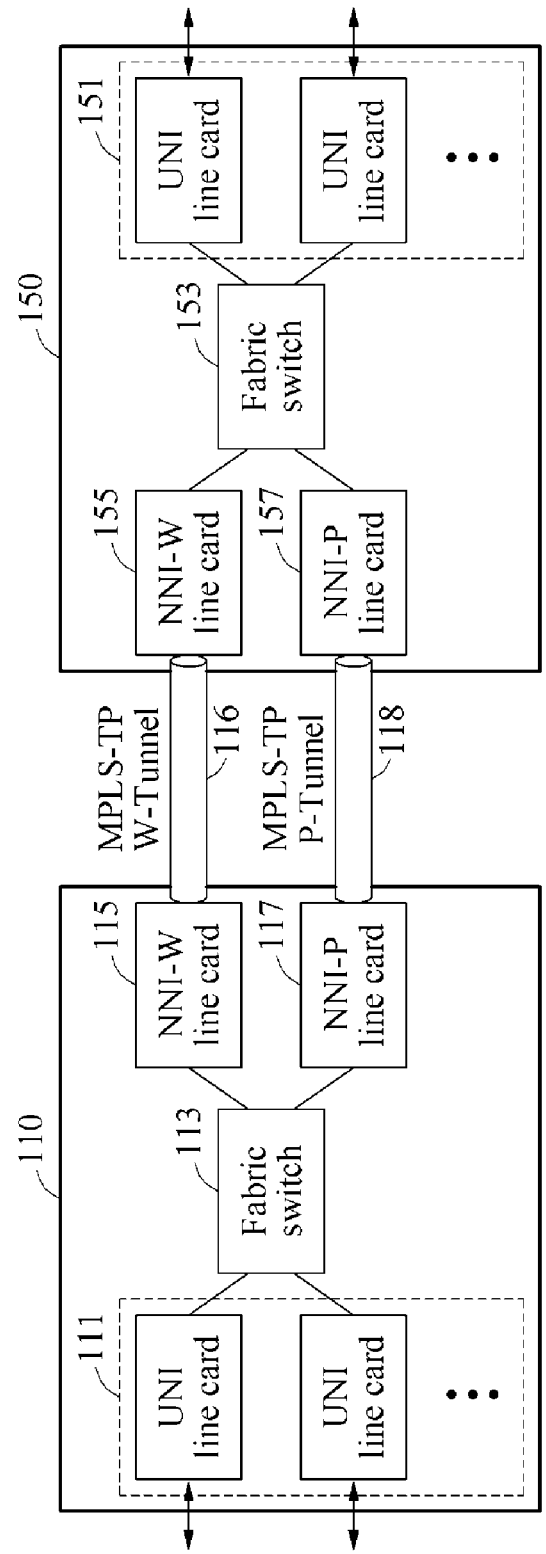
FIG. 1 is a block diagram illustrating a multiprotocol label switching-transport profile (MPLS-TP) based packet transmission apparatus according to an embodiment.

Hereinafter, example embodiments will be described in detail with reference to the accompanying drawings.

It should be understood, however, that there is no intent to limit this disclosure to the particular example embodiments disclosed. On the contrary, example embodiments are to cover all modifications, equivalents, and alternatives falling within the scope of the example embodiments.

As used herein, the singular forms "a," an and the are intended to include the plural forms as well, unless the context clearly indicates otherwise. It will be further understood that the terms "include" and/or "have," when used in this specification, specify the presence of stated features, integers, steps, operations, elements, components or combinations thereof, but do not preclude the presence or addition of one or more other features, integers, steps, operations, elements, components, and/or groups thereof.

Unless otherwise defined, all terms including technical and scientific terms used herein have the same meaning as commonly understood by one of ordinary skill in the art to which these example embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure.

Multiprotocol label switching technology (MPLS) relates to technology for setting a predetermined path with respect to a series of packets by operating in connection with, for example, an Internet protocol (IP), an asynchronous transfer mode (ATM), and a frame relay network protocol. In this example, a label assigned for each packet may be used to reduce a time of verifying an address of a node to which a router is to transmit a corresponding packet. The MPLS technology may also provide a connection-oriented packet service by labeling packets for various services.

In general, based on an open systems interconnection (OSI) reference model, the MPLS technology may allow packets to be transferred on a layer 2 on which switching is performed.

Multi protocol label switching-transport profile (MPLS-TP) technology may use a profile required for transmission while maintaining an MPLS architecture and a forwarding function, and provide a packet service based transmission network at a low cost and high efficiency by enhancing operations, administration, and maintenance (OAM) and protection switching functions.

FIG. 1 is a block diagram illustrating an MPLS-TP based packet transmission apparatus according to an embodiment.

FIG. 1 illustrates a packet transmission apparatus 110 and a packet transmission apparatus 150.

The packet transmission apparatus 110 may include at least one user network interface (UNI) line card, for example, a UNI line card 111, a fabric switch 113, and network-to-network interface (NNI) line cards, for example, a network-to-network interface working (NNI-W) line card 115 and a network-to-network interface protection (NNI-P) line card 117.

The UNI line card 111 may receive traffic including a client signal and transfer the received traffic to the fabric switch 113. A configuration of the UNI line card 111 will be described with reference to FIG. 13.

The fabric switch 113 may perform switching on the traffic based on a unit of line card. The fabric switch 113 may be provided as an application specific standard product (ASSP) based chip or an ASSP-based chip set configured to perform a data exchange among a plurality of line cards irrespective of a protocol. By using the fabric switch 113, data transmission may be performed between the UNI line card 111 and the NNI line cards 115 and 117.

The NNI line cards 115 and 117 may transmit a frame received through the fabric switch 113 to a corresponding output port by assigning an MPLS-TP label based on corresponding tunnel information. Here, interfaces of the UNI line card 111 and the NNI line cards 115 and 117 may include ports having various link capacities, for example, 1 gigabyte per second (Gb/s), 10 Gb/s, 10 mega bit per second (Mbps), 100 Mbps, and 1000 Mbps.

The NNI-W line card 115 may generate an MPLS-TP working tunnel 116 to transmit the traffic transferred through the fabric switch 113.

The NNI-P line card 117 may generate an MPLS-TP protection tunnel 118 to transmit the traffic transferred through the fabric switch 113 when a fault occurs on a path of the NNI-W line card 115.

The NNI-W line card 115 and the NNI-P line card 117 may be identified based on a port through which the traffic is transferred.

The packet transmission apparatus 110 may be connected to the packet transmission apparatus 150 in a protection switching domain through the MPLS-TP working tunnel 116 and the MPLS-TP protection tunnel 118.

Since the descriptions of the UNI line card 111, the fabric switch 113, and the NNI-W line card 115, and the NNI-P line card 117 of the packet transmission apparatus 110 are also applicable to a UNI line card 151, a fabric switch 153, and an NNI-W line card 155, and an NNI-P line card 157 of the packet transmission apparatus 150, repeated description will be omitted.

Configurations of the NNI line cards 115 and 117 will be described with reference to FIG. 2.

Figure 2:
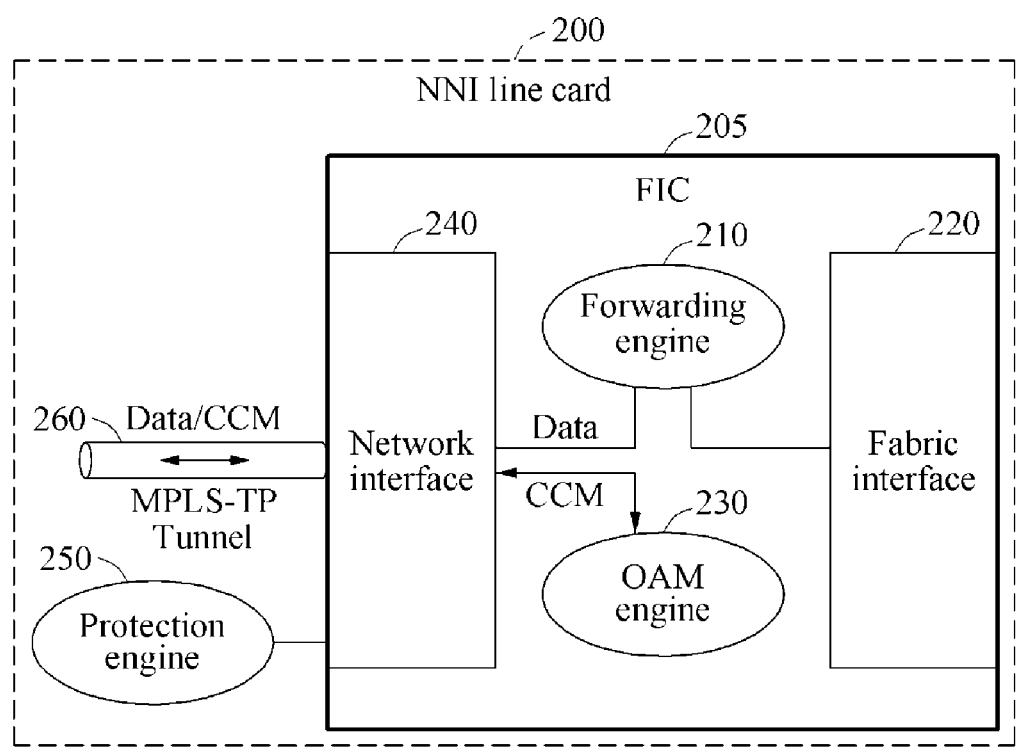
FIG. 2 is a block diagram illustrating a network-to-network interface (NNI) line card of a packet transmission apparatus according to an embodiment.

FIG. 2 is a block diagram illustrating an NNI line card of a packet transmission apparatus according to an embodiment.

Referring to FIG. 2, an NNI line card 200 of a packet transmission apparatus may include a forwarding engine 210, an OAM engine 230, and a protection engine 250.

The forwarding engine 210 may edit an MPLS label to a header of a client packet received from a fabric switch through a fabric interface 220, and forward a protection switching command received from the protection engine 250 to an output port. Here, it is understood that the editing of the MPLS label to the header of the client packet' includes, for example, adding, changing, and removing the MPLS label to the header of the client packet. The OAM engine 230 may detect whether a fault occurs on a path using a continuity check message (CCN) packet periodically received through an MPLS-TP tunnel 260, and transmit an OAM event to the protection engine 250 through a network interface 240.

The OAM event may be a fault-related event, for example, loss of connection (LoC) and clear-loss of connection (C-LoC). The protection engine 250 may determine a protection switching command based on the OAM event received from the OAM engine 230, and transfer the protection switching command to the forwarding engine 210.

The protection engine 250 may determine the protection switching command using a protection switching protocol.

The forwarding engine 210 and the OAM engine 230 may be implemented through a fabric interface chip (FIC) 205, and the protection engine 250 may be implemented through a field programmable gate array (FPGA).

The aforementioned function of the NNI line card 200 may be commonly applicable to the NNI-W line card 115 and the NNI-P line card 117.

In an example, elements of the NNI line card 200 may be configured as hardware to quickly process an OAM packet and a protection switching message required for an MPLS-TP protection switching, thereby ensuring a fault recovery time within 50 milliseconds (ms) despite an increase in the number of MPLS-TP bidirectional paths, for example, tunnels.

To implement hardware-based MPLS-TP protection switching, the FIC 205 provides functions as follows:

a function to quickly transmit an OAM event, for example, a local OAM event packet, from an OAM engine of an NNI-W line card to a protection engine of the NNI-W line card;

a function to transfer an OAM event, for example, a remote OAM event packet from the protection engine of the NNI-W line card to a protection engine of an NNI-P line card;

a function to transmit a protection switching message, for example, an automatic protection switching (APS) message and a protection state coordination (PSC) message generated in the protection engine of the NNI-P line card to a corresponding MPLS-TP tunnel interface;

a function to quickly transfer the protection switching message received through the corresponding MPLS-TP tunnel interface to the protection engine of the NNI-P line card;

a function to transfer a protection switching command, for example, a switch-over packet from the protection engine of the NNI-P line card to a corresponding UNI line card; and a function to quickly changing an MPLS-TP tunnel path in the corresponding UNI line card receiving the protection switching command.

The aforementioned functions will be described with reference to the following drawings.

Figure 3:
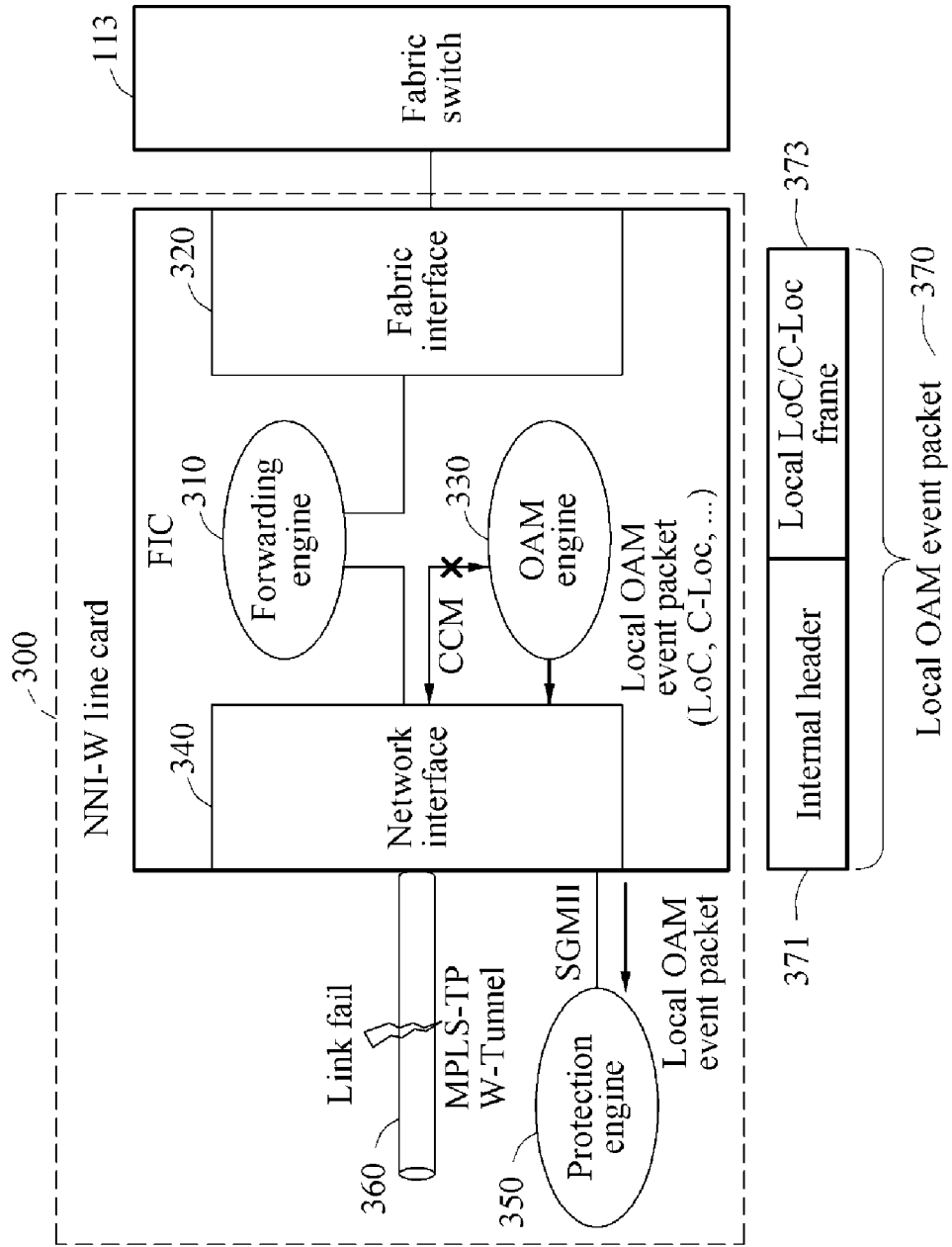
FIG. 3 is a block diagram illustrating a procedure of transferring a local operations, administration, and maintenance (OAM) event from an NNI-working (NNI-W) line card of a packet transmission apparatus to a protection engine according to an embodiment.

FIG. 3 is a block diagram illustrating a procedure of transferring an OAM event from an NNI-W line card of a packet transmission apparatus to a protection engine according to an embodiment.

Referring to FIG. 3, an NNI-W line card 300 may include a forwarding engine 310, an OAM engine 330, and a protection engine 350.

The forwarding engine 310 may edit an MPLS label to a header of a client packet received from the fabric switch 113 through a fabric interface 320, and forward a protection switching message received from the protection engine 350 to an output port.

The OAM engine 330 may detect whether a fault occurs on a path using a CCM packet periodically received through an MPLS-TP working tunnel 360. The OAM engine 330 may transmit an OAM event, for example, a fault event based on a result of the detecting to the protection engine 350 through a network interface 340.

The OAM engine 330 may store all OAM event occurring during a predetermined period of time in one packet frame, and transmit an OAM packet generated by adding an internal overhead to the one packet frame to the protection engine 350. As an example, when three CCM packets are not consecutively received for, for example, 11.55 ms, the OAM engine 330 may define an OAM event to be in an LoC state and inform the protection engine 350 of the OAM event. In this example, the internal overhead may include information for classifying a plurality of OAM events, for example, APP_EXT 415 of FIG. 4.

The OAM packet generated by the OAM engine 330 may be, for example, a local OAM event packet 370. The local OAM event packet 370 may include an internal overhead 371 and a local LoC/C-LoC frame 373.

The OAM engine 330 may transmit the OAM packet to the protection engine 350 through a port connected with a fabric interface chip. Here, the port connected with the fabric interface chip may be, for example, a port of serial gigabit medium independent interface (SGMII). The protection engine 350 may generate a protection switching message based on the OAM event included in the OAM packet received from the OAM engine 330, and transfer the corresponding protection switching message to a counterpart protection engine through the forwarding engine 310.

In general, a protection engine may be included in a central processing unit (CPU) in a software-based protection switching scheme, an event may be stored in a first-in first-out (FIFO) in a trap form such that the CPU reads the event stored in the FIFO periodically. In such event FIFO scheme, a portion of event may be lost due to a difference between a speed of storing the event in the FIFO and a speed of reading the event stored in the FIFO. Also, in the event FIFO scheme, the event may be read in the FIFO and transferred to software through a parsing based on a callback function. In this example, a time of transferring a result may vary based on a CPU performance.

In an example, when the fault event detected by the OAM engine 330 is transferred to the protection engine 350, all events occurring during a predetermined period of time may be transmitted using one OAM packet. Thus, an operation of transferring the OAM packet to the protection engine 350 may be reduced from writing and reading operations in the FIFO to one operation and may not be affected by the CPU performance. Also, a plurality of events occurring simultaneously may be transmitted at a time and thus, a time of transferring an OAM event may be reduced.

A frame format transferring the OAM event in the local OAM event packet 370 will be described with reference to FIG. 4.

Figure 4:
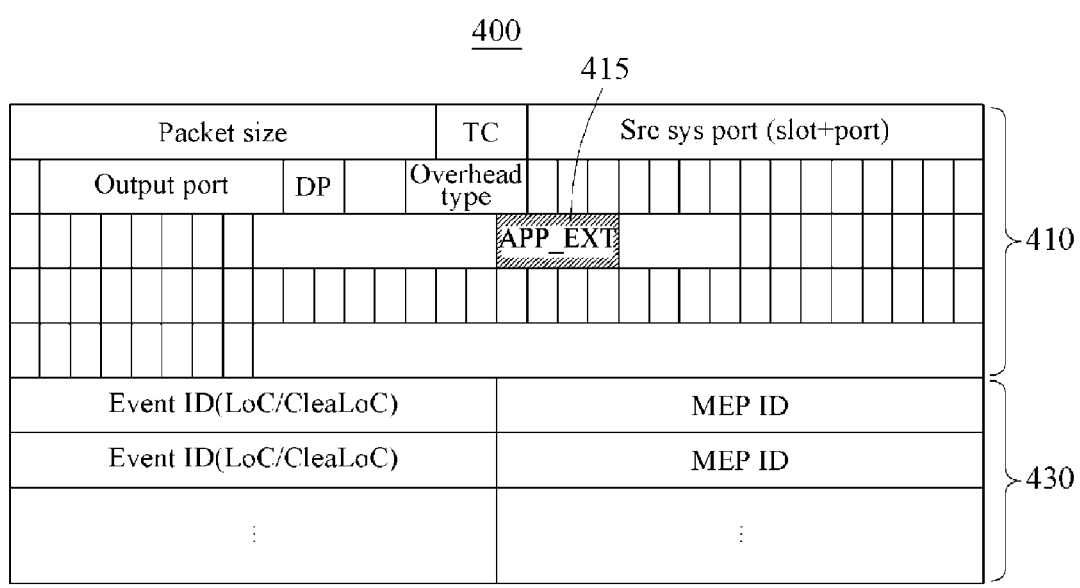
FIG. 4 is a diagram illustrating a frame format of an OAM packet transferring an OAM event to a protection engine of an NNI-W engine according to an embodiment.

FIG. 4 is a diagram illustrating a frame format of an OAM packet transferring an OAM event to a protection engine of an NNI-W engine according to an embodiment.

Referring to FIG. 4, an OAM packet 400 may include an internal overhead 410 and OAM event information 430.

The internal overhead 410 may include the APP_EXT 415 corresponding to information for classifying, for example, a packet size, a transmission convergence (TC) sub-layer, an output port, an overhead type, and a plurality of OAM packet types.

The OAM event information 430 may include, for example, MEP ID information and an event ID of an LoC event or a C-LoC event.

FIG. 5 is a block diagram illustrating a procedure of transmitting an OAM event from a protection engine of an NNI-W line card to a protection engine of an NNI-P line card in a packet transmission apparatus according to an embodiment.

FIG. 5 illustrates an NNI-W line card 510 and an NNI-P line card 550.

The NNI-W line card 510 may include a first forwarding engine 511, a first fabric interface 512, a first OAM engine 513, a first network interface 514, a first protection engine 515, an MPLS-TP working tunnel 516, and a first forwarding database (FDB) table 517.

The NNI-P line card 550 may include a second forwarding engine 551, a second fabric interface 552, a second OAM engine 553, a second network interface 554, a second protection engine 555, an MPLS-TP protection tunnel 556, and a second FDB table 557. In this example, the second forwarding engine 551 and the second OAM engine 553 may be implemented through a second fabric interface chip 558, and the second protection engine 555 may be implemented through an FPGA.

In an example, when a fault occurs in the MPLS-TP working tunnel 516 of the NNI-W line card 510, the first protection engine 515 of the NNI-W line card 510 may transfer the OAM event received from the first OAM engine 513 to the second protection engine 555 of the NNI-P line card 550.

In this example, the first protection engine 515 may transfer the OAM event of the NNI-W line card 510 to the second protection engine 555 of the NNI-P line card 550 using a layer 2 (L2) forwarding function based on a predetermined virtual local area network (VLAN) identification (ID) and a media access control (MAC) address of the second protection engine 555.

The second fabric interface chip 558 may receive an Ethernet frame type OAM event packet, for example, a remote OAM event packet, from the first protection engine 515 of the NNI-W line card 510 through a fabric switch.

The second fabric interface chip 558 may search for a forwarding table, for example, the second FDB table 557, previously set based on an VLAN ID and a MAC address of a destination of the OAM packet received through a fabric switch 530, and acquire a port connected with the second protection engine 555 and a number of the NNI-P line card 550 as a result of the searching.

The second fabric interface chip 558 may transfer the OAM event of the NNI-W line card 510 to the second protection engine 555 using the port connected with the second protection engine 555 and the number of NNI-P line card.

In this example, a configuration of transferring the OAM event to the second protection engine 555 will be described with reference to FIG. 6.

FIG. 6 is a diagram illustrating a frame format of a packet transferring an OAM event to a protection engine of an NNI-P line card of a packet transmission apparatus according to an embodiment.

Referring to FIG. 6, an OAM packet 600 may be configured to transfer an OAM event from a first protection engine to a second protection engine. The OAM packet 600 may include an internal overhead 610, an L2 header 630, and OAM event information 650.

The internal overhead 610 may include information, for example, APP_EXT for classifying a packet size, a TC sub-layer, an output port, an overhead type, and various OAM packet types in a protection engine.

Also, the internal overhead 610 may include 5 bytes trap information, for example, advance_trap_info.

The L2 header 630 may include, for example, a destination address (DA), a source address (SA), a VLAN tagging packet identifier (TPID), VLAN tag control information (TCI), and an Ethernet type, for example, Ethertype. The DA may include, for example, a MAC address of a remote protection engine.

The OAM event information 650 may include, for example, a length of an OAM event, and an MEP ID.

The L2 header 630 and the OAM event information 650 may correspond to an L2 Ethernet packet format.

Figure 7:
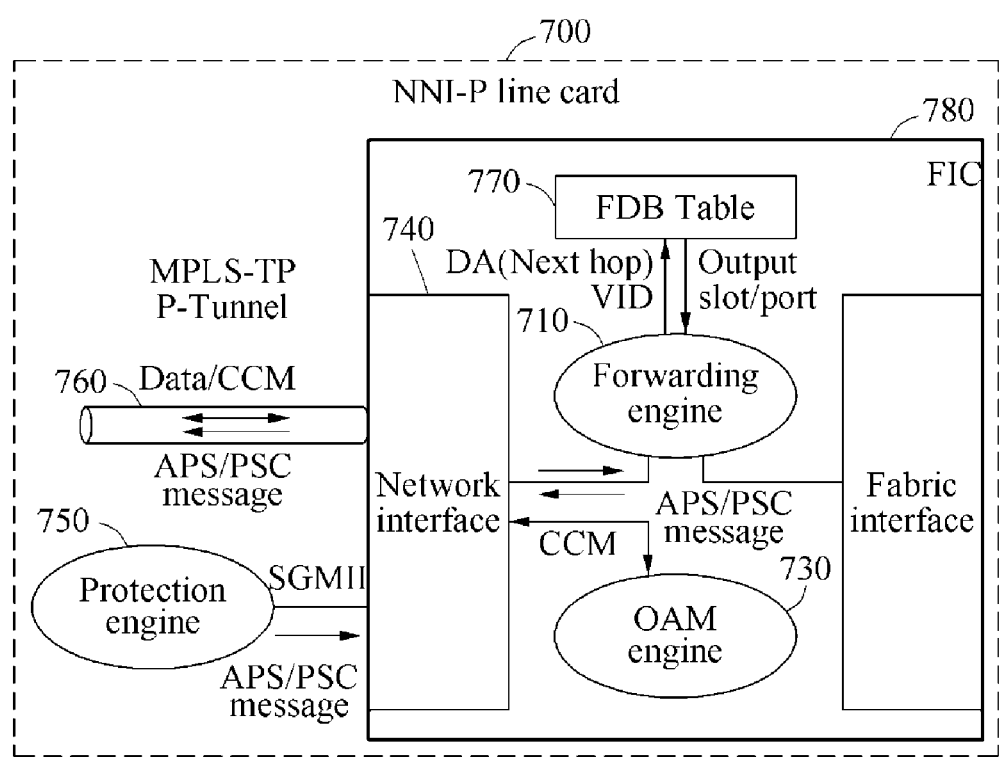
FIG. 7 is a block diagram illustrating a procedure of transmitting a protection switching message from NNI-W and NNI-P line cards of a packet transmission apparatus to an MPLS-TP tunnel interface according to an embodiment.

FIG. 7 is a block diagram illustrating a procedure of transmitting a protection switching message from NNI-W and NNI-P line cards of a packet transmission apparatus to an MPLS-TP tunnel interface according to an embodiment.

Referring to FIG. 7, an NNI-P line card 700 may include a second forwarding engine 710, a second OAM engine 730, a network interface 740, a second protection engine 750, an MPLS-TP protection tunnel 760, and an FDB table 770. The second forwarding engine 710, the second OAM engine 730, the network interface 740, and the FDB table 770 may be implemented through a second FIC 780.

To allow protection engines on both ends of a protection switching domain to select the same path, the second protection engine 750 may transmit a protection switching message to a counterpart protection engine of the protection switching domain through MPLS-TP protection tunnel 760. The protection switching message may be, for example, an APS message and a PSC message.

The second FIC 780 may transmit the protection switching message to the network interface 740 of the MPLS-TP protection tunnel 760 using an L2 forwarding function based on a VLAN ID and a MAC address of the MPLS-TP protection tunnel 760.

When the MPLS-TP protection tunnel 760 is generated in the NNI-P line card 700, the second FIC 780 may inform the second protection engine 750 of interface information and a label of the MPLS-TP protection tunnel 760. The interface information may include, for example, a destination MAC address and a VLAN ID.

The second FIC 780 may generate an L2 forwarding table based on information on an output port, the VLAN ID, and the MAC address of the MPLS-TP protection tunnel 760. The L2 forwarding table may be, for example, the FDB table 770.

The second FIC 780 may search for the FDB table 770 previously set based on the VLAN ID and the destination MAC address of the protection switching message received in the NNI-P line card 700. The second FIC 780 may transmit the protection switching message by detecting an output port connected with a protection tunnel of the counterpart NNI-P line card of the protection switching domain found as a result of the searching. In this example, a format of the protection switching message transmitted by the second protection engine 750 so as to be transferred through the MPLS-TP tunnel interface 740 will be described with reference to FIG. 8.

Figure 8:
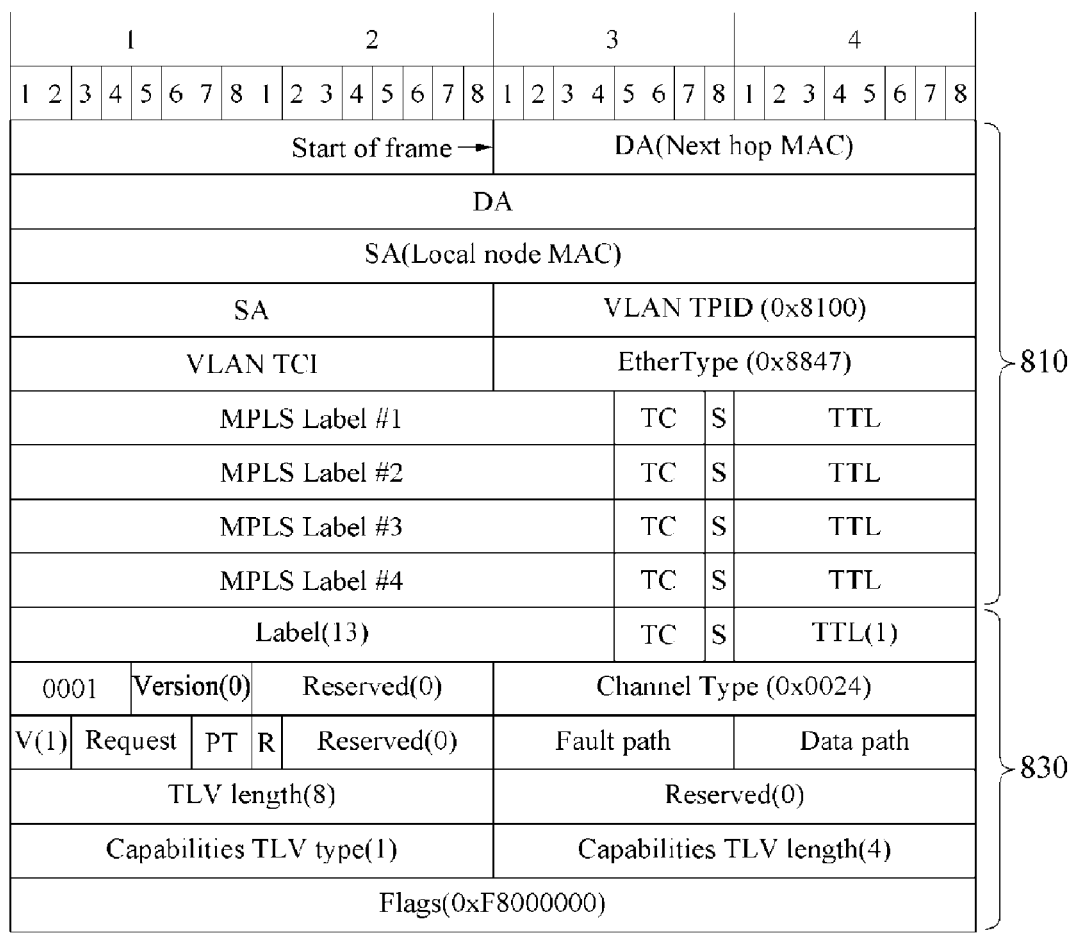
FIG. 8 is a diagram illustrating a format of a protection switching message transmitted from a packet transmission apparatus to an MPLS-TP tunnel interface according to an embodiment.

FIG. 8 is a diagram illustrating a format of a protection switching message transmitted from a packet transmission apparatus to an MPLS-TP tunnel interface according to an embodiment.

Referring to FIG. 8, a protection switching message 800 may include MPLS-TP tunnel interface information 810 and automatic protection coordination (APC) message information 830. Here, an APC message may include, for example, an APS message and a PSC message.

The MPLS-TP tunnel interface information 810 may include, for example, a DA, an SA, a VLAN TPID, VLAN TCI, an Ether type, and MPLS labels. The DA may include, for example, a MAC address of a next hop. The SA may include, for example, a MAC address of a local node.

The APC message information 830 may include, for example, version information, a channel type, a fault path, a data path, a type length value (TLV) Length, a capabilities TLV type, a capabilities TLV length, and flags of the APC message.

Figure 9:
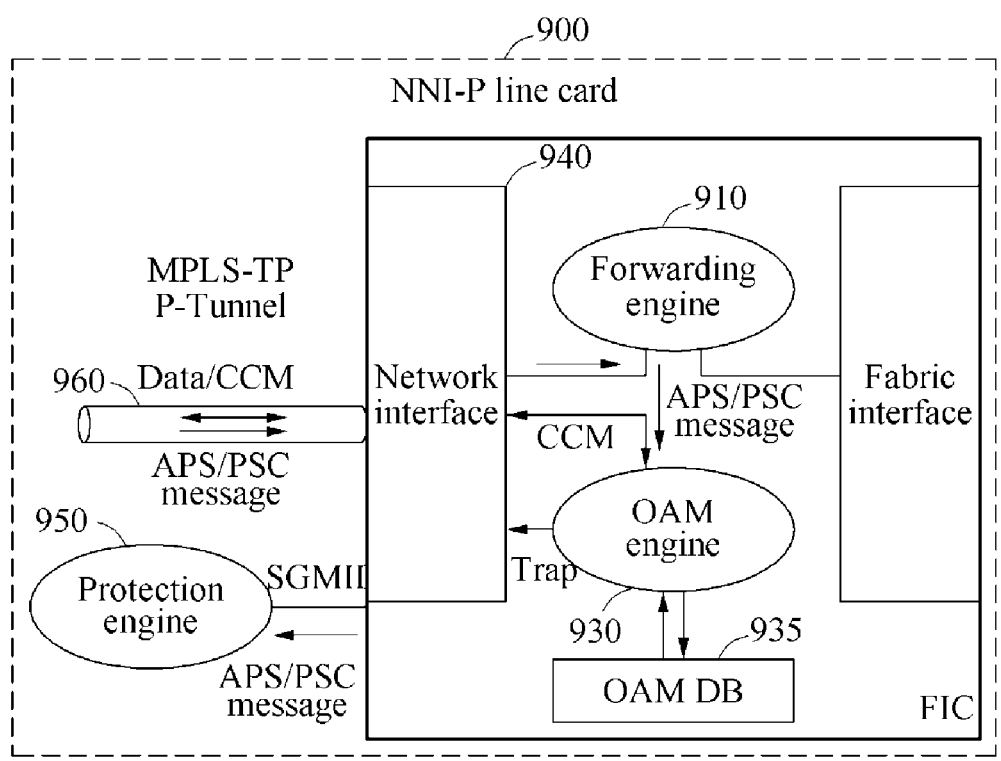
FIG. 9 is a block diagram illustrating a procedure of transferring a protection switching message from NNI-W and NNI-P line cards of a packet transmission apparatus to a protection engine according to an embodiment.

FIG. 9 is a block diagram illustrating a procedure of transferring a protection switching message from NNI-W and NNI-P line cards of a packet transmission apparatus to a protection engine according to an embodiment.

Referring to FIG. 9, an NNI-P line card 900 include a forwarding engine 910, an OAM engine 930, an OAM DB 935, a network interface 940, a protection engine 950, and an MPLS-TP protection tunnel 960.

The OAM engine 930 may quickly transfer a protection switching message received through the MPLS-TP protection tunnel 960 to the protection engine 950 using an OAM trap function. The OAM trap function may be, for example, a function to transmit information to be verified by a manager and information on a predetermined event non-simultaneously occurring in a system to a predetermined port or a CPU so as to inform the manager of. the information.

For example, the OAM engine 930 may trap the protection switching message received through the MPLS-TP protection tunnel 960 to a predetermined port connected with the protection engine 950. In this example, an internal overhead including MEP ID information, for example, a reference numeral 1015 of FIG. 10 may be added to the protection switching message trapped to the protection engine 950. A format of the protection switching message trapped to the protection engine 950 will be described with reference to FIG. 10.

The OAM DB 935 may generate a CCM packet and transmit the generated CCM packet. The OAM DB 935 may store information used to verify whether a fault occurs in a corresponding tunnel based on a received CCM packet. The OAM DB 935 may include, for example, a MEP DB and a remote MEP (RMEP) DB.

The OAM engine 930 may transmit a CCM packet to an output port of a corresponding tunnel by generating the CCM packet of a header to which a label of the corresponding tunnel is added every CCM period set in the MEP DB. The OAM engine 930 may define an OAM event based on the received CCM packet and the MEP DB. Thus, the OAM engine 930 may define the OAM event to be in an LoC state when the CCM packet is not received for a period of time corresponding to 3.5 times of the CCM period. When the CCP packet is received in the LoC state, the OAM engine 930 may define the OAM event to be in a C-LoC state. The OAM engine 930 may store the defined LoC/C-LoC state for each tunnel of the RMEP DB. The protection switching message received through the MPLS-TP protection tunnel 960 may be transmitted from the network interface 940 to the forwarding engine 910, and then transferred from the forwarding engine 910 to the OAM engine 930.

In an example, when the protection switching message received through the MPLS-TP protection tunnel 960 is another protection switching message differing from an APS message, the OAM engine 930 may add the other protection switching message as an OAM channel type and transfer the other protection switching message to the protection engine 950, thereby obtaining an extendibility to a message type added through standardization. The foregoing example is to prevent the protection switching message from being discarded in the forwarding engine 910. In a typical scheme, since only APS type protection switching message is defined APS, another type of protection switching message such as a PSC type message may be unclassifiable to be an OAM packet in a forwarding engine and thus, may be discarded. In an example, the other protection switching message differing from the APS message may be added to be the OAM channel type so as to be classified into the OAM packet in the forwarding engine and received in an OAM engine.

When the protection switching message is a PSC message corresponding to a channel type 0x0024, the OAM engine 930 may correct a filtering table for an MEL of the PSC message and transfer the corrected PSC message to the protection engine 950. Through this, the PSC message may be transferred to the OAM engine 930 irrespective of the MEL.

In an example, in lieu of a CPU, the OAM engine 930 may directly transfer the protection switching message transmitted from the OAM engine to a protection engine to quickly transfer the protection switching message to the protection engine 950. Also, MEP ID information and the protection switching message may be transferred using one packet. Through this, the protection engine 950 receiving the protection switching message may not need to search for a corresponding MEP using MPLS-TP label information, thereby reducing a switching time.

FIG. 10 is a diagram illustrating a format of a PSC type protection switching message transmitted from a packet transmission apparatus to a protection engine according to an embodiment.

Referring to FIG. 10, a protection switching message 1000 may include an internal overhead 1010, MPLS-TP tunnel interface information 1030, and APC message information 1050.

The internal overhead 1010 may include a trap code, an MEP ID 1015, a packet size, a TC, an output port, an overhead type, and information, for example, APP_EXT for classifying various OAM packets.

Since the descriptions of the MPLS-TP tunnel interface information 810 and the APC message information 830 are also applicable here, repeated descriptions related to the MPLS-TP tunnel interface information 1030 and the APC message information 1050 will be omitted.

Figure 11:
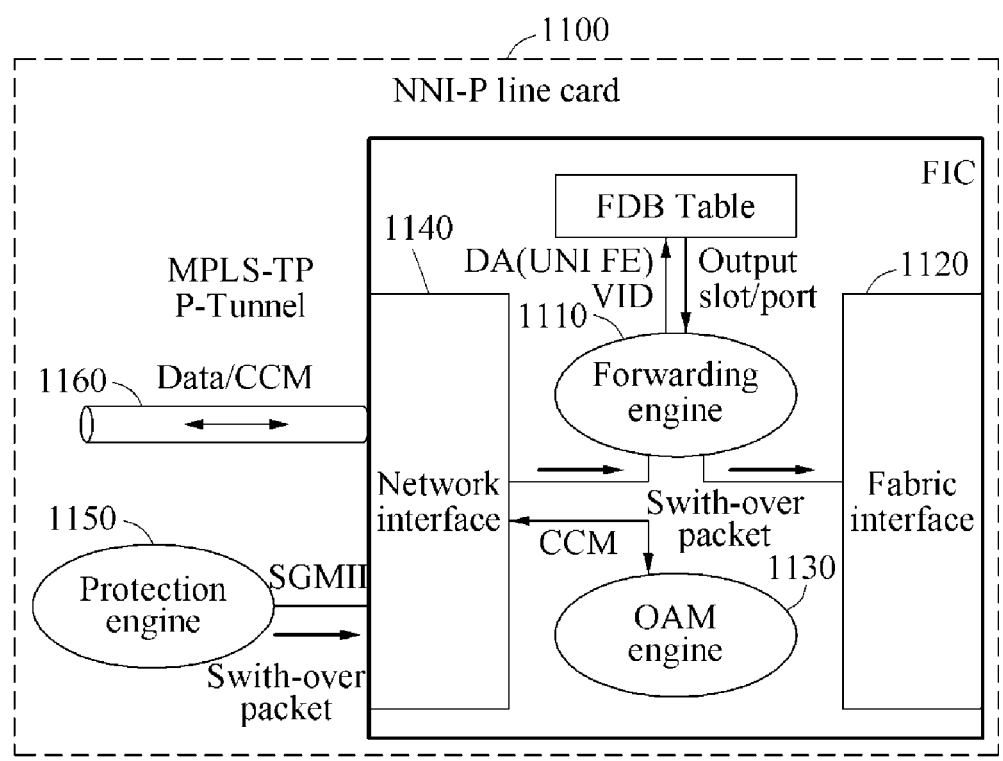
FIG. 11 is a block diagram illustrating a procedure of transferring, to a user network interface (UNI) line card, a protection switching command that is received by NNI-W and NNI-P line cards of a packet transmission apparatus from a protection engine according to an embodiment.

FIG. 11 is a block diagram illustrating a procedure of transferring, to a UNI line card, a protection switching command that is received by an NNI-P line card of a packet transmission apparatus from a protection engine according to an embodiment.

Referring to FIG. 11, an NNI-P line card 1100 may include a forwarding engine 1110, a fabric interface 1120, an OAM engine 1030, a network interface 1140, a protection engine 1150, an MPLS-TP protection tunnel 1160, and an FDB table.

To switch a tunnel for transmitting data traffic from an MPLS-TP working tunnel to the MPLS-TP protection tunnel 1160, the protection engine 1150 of the NNI-P line card 1100 may transmit a protection switching command to a UNI line card through the fabric interface 1120.

In an example, the protection engine 1150 may transfer the protection switching command to the UNI line card using a protection switching command packet based on an L2 forwarding function of a VLAN ID and a MAC address of the forwarding engine of the UNI line card. In this example, the protection switching command packet may be, for example, a switch-over packet.

The protection switching command packet may include, for example, information on a switching command, and an L2 header including a MAC address of a second protection engine and a MAC address of the forwarding engine of the UNI line card.

The protection engine 1150 may generate an L2 forwarding table based on information on an output port, the VLAN ID, and the MAC address of the forwarding engine of the UNI line card.

The protection engine 1150 may search for the output port connected with the UNI line card using the L2 forwarding table previously set based on the VLAN ID and the MAC address of the destination of the packet received through the MPLS-TP protection tunnel 1160.

The protection engine 1150 may transfer the protection switching command to the UNI line card through the found output port. A format of the protection switching packet transferring the protection switching command will be described with reference to FIG. 12.

Figure 12:
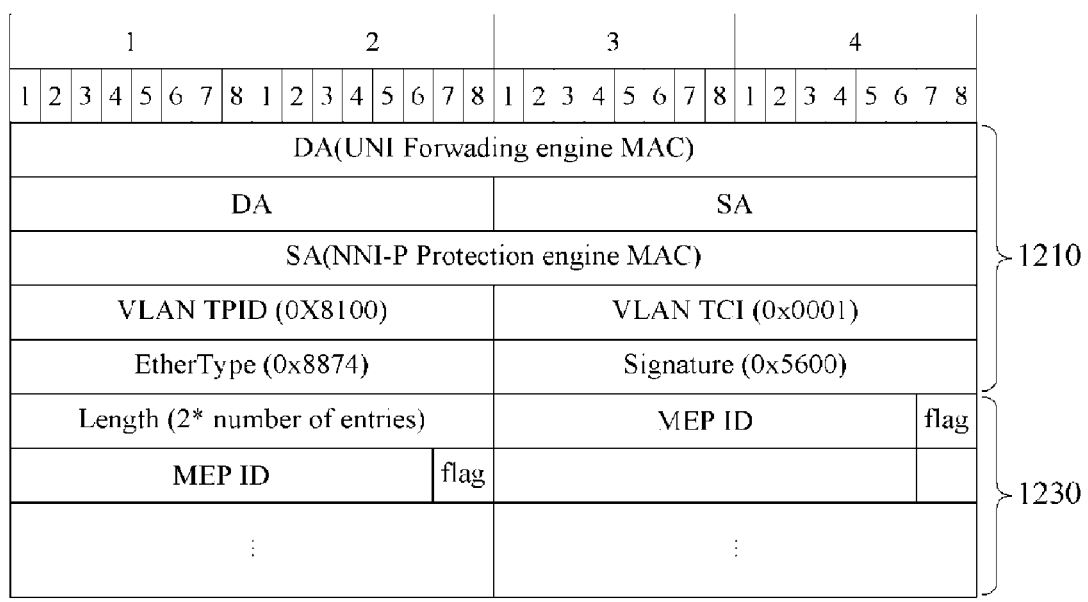
FIG. 12 is a diagram illustrating a format of a protection switching command packet transmitted from a protection engine of a packet transmission apparatus to a UNI line card according to an embodiment.

FIG. 12 is a diagram illustrating a format of a protection switching command packet, for example, a switch-over packet transmitted from a protection engine of a packet transmission apparatus to a UNI line card according to an embodiment.

Referring to FIG. 12, a protection switching command packet 1200 may include an L2 header 1210 and switching command information 1230.

The L2 header 1210 may include, for example, a DA, an SA, a VLAN TPID, VLAN TCI, an Ether type, and a signature.

The DA may include, for example, a MAC address of a forwarding engine of a UNI line card.

The SA may include, for example, a MAC address of a protection engine of an NNI-P line card.

The switching command information 1230 may include, for example, flags, MEP IDs, and a length of a switching command indicating twice of the number of tunnels to be changed.

Figure 13:
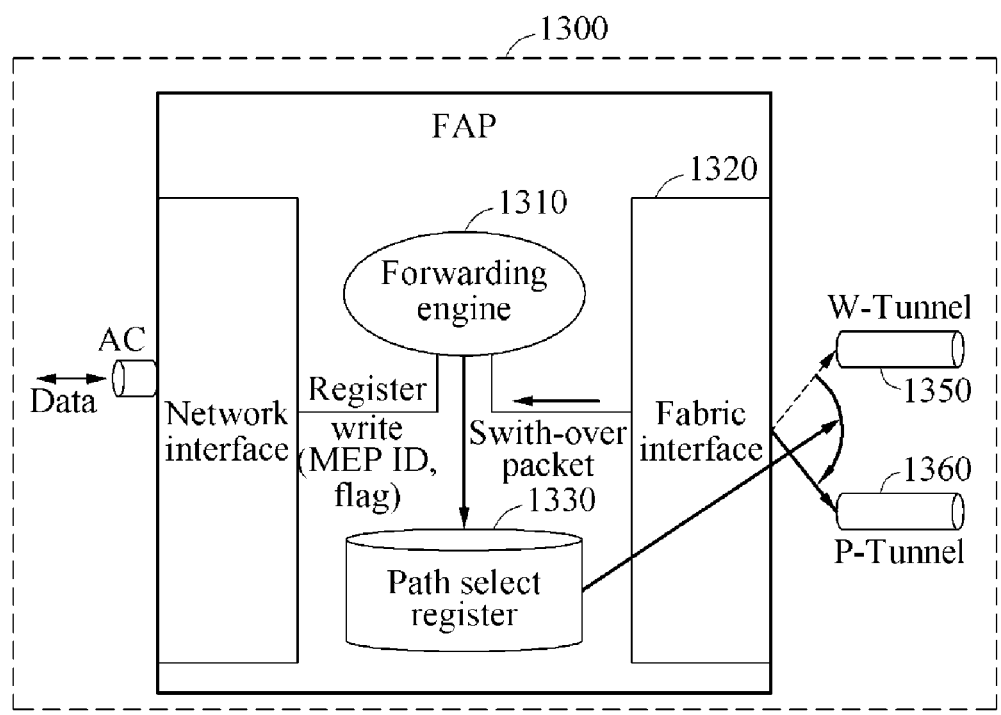
FIG. 13 is a block diagram illustrating a procedure of changing an MPLS-TP tunnel path for transmitting data traffic in a UNI line card of a packet transmission apparatus according to an embodiment.

FIG. 13 is a block diagram illustrating a procedure of changing an MPLS-TP tunnel path for transmitting data traffic in a UNI line card of a packet transmission apparatus according to an embodiment.

Referring to FIG. 13, a UNI line card 1300 may include a forwarding engine 1319, a fabric interface 1320, a path selecting register 1330, and a network interface.

The forwarding engine 1310 may receive a protection switching command packet through the fabric interface connected with a fabric interface.

The path selecting register 1330 may select a path from an MPLS-TP working tunnel 1350 and an MPLS-TP protection tunnel 1360.

When the protection switching command packet is received, the forwarding engine 1310 may search for an offset of the path selecting register 1330 using an MEP ID included in the protection switching command packet. The forwarding engine 1310 may change an entry value of the path selecting register 1330 found through the searching based on switching command information and the MEP ID, thereby switching the path through which the path selecting register 1330 transfers the data traffic from the MPLS-TP working tunnel 1350 to the MPLS-TP protection tunnel 1360.

In an example, the forwarding engine 1310 may directly change a value of the path selecting register. Thus, when compared to a scheme in which a CPU changes the path through an API, a change of the path may be performed faster and a protection switching time may be reduced.

According to an example embodiment, it is possible to quickly process an OAM packet and a protection switching message required for hardware-based MPLS-TP protection switching in a fabric interface chip, thereby ensuring a fault recovery time within 50 ms despite an explosive increase in the number of MPLS-TP bidirectional paths.

According to an example embodiment, it is possible to directly transmit all events occurring in an OAM engine during a predetermined period of time OAM to a protection engine, thereby reducing a time of transferring the OAM event to the protection engine.

According to an example embodiment, it is possible to directly transmit a protection switching message from an OAM engine to a protection engine, thereby increasing a speed of transferring the protection switching message.

According to an example embodiment, it is possible to transfer MEP ID information and a protection switching message using one packet such that a protection engine receiving the protection switching message does not search for a corresponding MEP using MPLS-TP label information and reduces a switching time.

According to an example embodiment, it is possible to change an entry value of a path selecting register based on switching command information and MEP ID included in a switching command information packet, thereby quickly changing an MPLS-TP tunnel path for transferring data traffic in a UNI line card.

The units described herein may be implemented using hardware components and software components. For example, the hardware components may include microphones, amplifiers, band-pass filters, audio to digital converters, and processing devices. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums.

The methods according to the above-described embodiments may be recorded, stored, or fixed in one or more non-transitory computer-readable media that includes program instructions to be implemented by a computer to cause a processor to execute or perform the program instructions. The media may also include, alone or in combination with the program instructions, data files, data structures, and the like. The program instructions recorded on the media may be those specially designed and constructed, or they may be of the kind well-known and available to those having skill in the computer software arts. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations and methods described above, or vice versa.

Although a few embodiments of the present disclosure have been shown and described, the present disclosure is not limited to the described embodiments. Instead, it would be appreciated by those skilled in the art that changes may be made to these embodiments without departing from the principles and spirit of the invention, the scope of which is defined by the claims and their equivalents.

What is claimed is:

1. A packet transmission apparatus comprising:
   at least one user network interface (UNI) line card configured to receive traffic including a client signal;
   a fabric switch configured to perform switching on the traffic based on a unit of line card;
   a network-to-network interface working (NNI-W) line card configured to generate a multiprotocol label switching-transport profile (MPLS-TP) working tunnel to transmit the traffic transferred through the fabric switch, to the MPLS-TP tunnel; and
   a network-to-network interface protection (NNI-P) line card configured to generate a MPLS-TP protection tunnel to transmit the traffic transferred through the fabric switch, to the MPLS-TP protection tunnel when a fault occurs on a path of the NNI-W line card, wherein
   each of the NNI-W line card and the NNI-P line card includes:
      an operations, administration, and maintenance (OAM) engine configured to detect whether the fault has occurred on the path, and transmit an OAM event based on a result of the detecting,
      a protection engine configured to transfer a protection switching message in response to the OAM event, and
      a forward engine configured to forward the traffic transferred through the fabric switch and the protection switching message to an output port of said each of the NNI-W line card and the NNI-P line card.

2. The packet transmission apparatus of claim 1, wherein the NNI-W line card and the NNI-P line card is classified based on a port through which the traffic is transmitted.

3. A packet transmission apparatus, comprising:
   at least one user network interface (UNI) line card configured to receive traffic including a client signal;
   a fabric switch configured to perform switching on the traffic based on a unit of line card;
   a network-to-network interface working (NNI-W) line card configured to generate a multiprotocol label switching-transport profile (MPLS-TP) working tunnel to transmit the traffic transferred through the fabric switch, to the MPLS-TP tunnel; and
   a network-to-network interface protection (NNI-P) line card configured to generate a MPLS-TP protection tunnel to transmit the traffic transferred through the fabric switch, to the MPLS-TP protection tunnel when a fault occurs on a path of the NNI-W line card, wherein
   the NNI-W line card includes:
      a first forward engine configured to edit an MPLS label in a header of a client packet and transmit the client packet to an output port;
      a first operations, administration, and maintenance (OAM) engine configured to detect whether the fault occurs on the path using a continuity check message (CCM) packet periodically received through the MPLS-TP working tunnel, and transmit an OAM event based on a result of the detecting; and
      a first protection engine configured to transfer a protection switching message to the first forwarding engine based on the OAM event,
      wherein the first forwarding engine and the first OAM engine are implemented using a first fabric interface chip, and
      the first OAM engine is configured to store all OAM events occurring during a predetermined period of time in one packet frame and transmit an OAM packet generated by adding an internal overhead to the one packet frame to the first protection engine.

4. The packet transmission apparatus of claim 3, wherein the first OAM engine is configured to transmit the OAM packet to the first protection engine through a port connected with the first fabric interface chip.

5. The packet transmission apparatus of claim 3, wherein the internal overhead includes information used to classify a plurality of OAM events.

6. The packet transmission apparatus of claim 3, wherein the NNI-P line card includes:
   a second forwarding engine configured to edit an MPLS label in a header of a client packet and transmit the client packet through an output port;
   a second OAM engine configured to detect whether a fault occurs on a path using a CCM packet periodically received through the MPLS-TP protection tunnel and provide notification about an OAM event based on a result of the detecting; and
   a second protection engine configured to determine a protection switching command based on the OAM event and an OAM event received from the first protection engine of the NNI-W line card, and transfer the protection switching command to the second forwarding engine,
   wherein when a fault occurs in the MPLS-TP working tunnel of the NNI-W line card, the first protection engine is configured to transfer an OAM event of the NNI-W line card to the second protection engine using an L2 forwarding function based on a predetermined virtual local area network (VLAN) identification (ID) and a media access control (MAC) address of the second protection engine.

7. The packet transmission apparatus of claim 6, wherein the second OAM engine and the second forwarding engine are implemented through a second fabric interface chip,
   wherein the second fabric interface chip is configured to receive the OAM packet from the first protection engine through a port connected with the first fabric interface chip, configured to search for a forwarding table previously set based on a VLAN IP and a MAC address of a destination of the OAM packet, and configured to transfer the OAM event of the NNI-W line card to the second protection switch engine through a port connected with the second protection engine and a number of the NNI-P line card found in a result of the searching.

8. The packet transmission apparatus of claim 6, wherein the second protection engine is configured to transmit a protection switching message to a counterpart protection engine of a protection switching domain through the MPLS-TP protection tunnel.

9. The packet transmission apparatus of claim 8, wherein the second fabric interface chip is configured to transmit the protection switching message to an interface of the MPLS-TP protection tunnel using the L2 forwarding function based on a VLAN IP and an MAC address of the MPLS-TP protection tunnel.

10. The packet transmission apparatus of claim 9, wherein when the MPLS-TP protection tunnel is generated, the second fabric interface chip is configured to inform the second protection engine of interface information and a label of the MPLS-TP protection tunnel and generate an L2 forwarding table based on information on an output port, the VLAN ID, and the MAC address of the MPLS-TP protection tunnel.

11. The packet transmission apparatus of claim 10, wherein the second fabric interface chip is configured to search for an L2 forwarding table previously set based on the a VLAN ID and a MAC address of a destination of a packet received in the NNI-P line card, and transmit the protection switching message by detecting an output port connected with a protection tunnel of a counterpart NNI-P line card of a protection switching domain obtained as a result of the searching.

12. The packet transmission apparatus of claim 6, wherein the second OAM engine is configured to trap a protection switching message received through the MPLS-TP protection tunnel to a predetermined port connected with the second protection engine.

13. The packet transmission apparatus of claim 12, wherein an internal overhead including maintenance entity group end point (MEP) ID information is added to the protection switching message trapped to the second protection engine.

14. The packet transmission apparatus of claim 12, wherein when the protection switching message received through the MPLS-TP protection tunnel is another protection switching message differing from an automatic protection switching (APS) message, the second OAM engine is configured to transfer the other protection switching message by adding the other protection switching message as a type of OAM channel.

15. The packet transmission apparatus of claim 12, wherein when the protection switching message is a protection state coordination (PSC) message, the second OAM engine is configured to correct a filtering table for a maintenance entity group level (MEL) of the PSC message and transfer, to the second protection engine, the PSC message in which the filtering table is corrected.

16. The packet transmission apparatus of claim 12, wherein the at least one UNI line card includes a forwarding engine configured to receive a protection switching command packet and a path selecting register configured to select one of the MPLS-TP working tunnel and the MPLS-TP protection tunnel, and the second protection engine is configured to transfer the protection switching command to the at least one UNI line card using the protection switching command packet based on an L2 forwarding function based on an VLAN ID and an MAC address of the forwarding engine of the at least one UNI line card.

17. The packet transmission apparatus of claim 16, wherein the second protection engine is configured to generate an L2 forwarding table based on information on an output port, the VLAN ID, and the MAC address of the forwarding engine of the at least one UNI line card.

18. The packet transmission apparatus of claim 17, wherein the second protection engine is configured to search for an output port connected with the at least one UNI line card using the L2 forwarding table previously set based on the VLAN ID and the MAC address of the destination of the received packet and transfer the protection switching command to the at least one UNI line card through the output port found through the searching.

19. The packet transmission apparatus of claim 16, wherein the protection switching command packet includes switching command information and an L2 header including the MAC address of the second protection engine and the MAC address of the forwarding engine of the at least one UNI line card.

20. The packet transmission apparatus of claim 19, wherein the forwarding engine of the at least one UNI line card is configured to search for an offset of the path selecting register based on an MEP ID in response to the receiving of the protection switching command packet, change an entry value of the path selecting register based on the switching command information, and change a transmission path of data traffic from the MPLS-MP working tunnel to the MPLS-TP protection tunnel or from the MPLS-TP protection tunnel to the MPLS-MP working tunnel.

* * * * *